United States Patent [19]
Zacharin

[11] 4,336,020
[45] Jun. 22, 1982

[54] JIGSAW PUZZLE FOR USE IN BILINGUAL EDUCATION

[76] Inventor: David Zacharin, P.O. Box 76, Graton, Calif. 95444

[21] Appl. No.: 169,187

[22] Filed: Jul. 15, 1980

[51] Int. Cl.³ .......................... G09B 5/04; A63F 9/10
[52] U.S. Cl. ................................. 434/157; 273/157 R
[58] Field of Search ..................... 434/157, 177, 428; 273/156, 157 R, 157 A

[56] References Cited

U.S. PATENT DOCUMENTS

| | | | |
|---|---|---|---|
| 1,415,245 | 5/1922 | Kennedy | 273/157 R |
| 2,861,358 | 11/1958 | Ward | 273/157 R |
| 3,055,118 | 9/1962 | Betancourt | 434/157 R |
| 3,426,452 | 2/1969 | Kerr et al. | 273/157 R X |
| 3,888,025 | 6/1975 | Schmieder | 434/157 |

OTHER PUBLICATIONS

Suburbia Mall Catalog, Item #456, Title Page, pp. 94-95, 1978.

*Primary Examiner*—William H. Grieb

[57] ABSTRACT

An educational aid designed to assist young children in the learning of a second language. The device consists of a recessed game board, a word grid and a set of jigsaw puzzle pieces. The word grid is in the form of a crossword like pattern of words given in two languages. The word grid is fitted into the recessed area of the game board with the jigsaw puzzle pieces designed for assembly over the word grid. The jigsaw puzzle when completed forms a picture covering all of the word grid except for those words which represent the puzzle illustration.

6 Claims, 3 Drawing Figures

JIGSAW PUZZLE FOR USE IN BILINGUAL EDUCATION

BACKGROUND OF THE INVENTION

This invention relates to a teaching aid which may be used as a multi-language learning device while giving the enjoyment of assembling a jigsaw puzzle.

There are presently numerous games for young children which are also designed to be educational. However, there is a paucity of games which act as an aid for bilingual education. With the ever increasing number of Spanish speaking people in this country, there has been an increased awareness of the need for bilingual education in the American educational system. Yet, the educational games on the market today are for the most part limited to the English language.

This, it is an object of the present invention to provide a puzzle which can be utilized as a visual multi-language learning aid.

A further object of the present invention is to provide a jigsaw puzzle which is both amusing and instructive.

Yet still a further object herein is the provision of a jigsaw puzzle when completed displays words or symbols related to the puzzle illustration through predetermined spaces of said illustration.

Other objects will become more readily apparent during the course of the following description.

SUMMARY OF THE INVENTION

The present invention consists of a game board having a recess into which a word grid is inserted, the word grid being a crossword like pattern of words given in two languages. Jigsaw puzzle pieces are assembled over the word grid forming a picture. The pieces when completely assembled cover all of the word grid except for those words which represent the puzzle illustration. The representative words appearing through predetermined windows formed by edges of the jigsaw puzzle pieces.

DESCRIPTION OF THE PREFERRED EMBODIMENT

Figure 1:
FIG. 1 is a front view of the word grid on top of which a jigsaw puzzle is to be constructed.

Referring to FIG. 1, there is shown a word grid base layer surrounded by a raised border. The word base contains numerous words given in two or more languages. The words being in the form of a crossword like pattern in order to camouflage the words. Of course, extra letters may be added to further camouflage the words.

The word grid is designed to be removable from the puzzle base. In this way, one word grid may be interchanged with other word grids. Each word grid may have a specific theme. For example, one word may deal with farm animals, another may deal with vehicles, and yet another with numbers. Any number of word grid themes may be devised.

Figure 2:
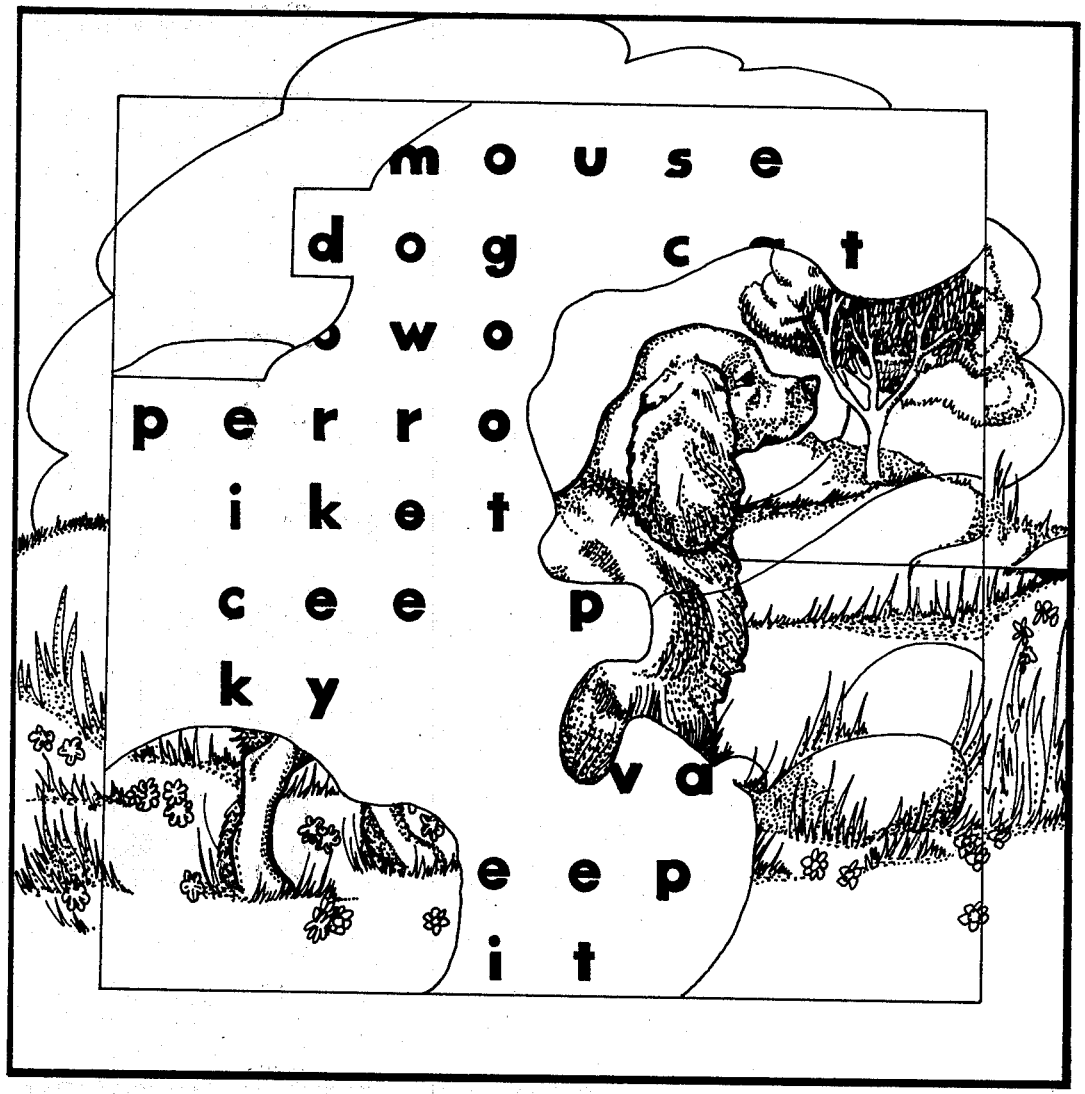
FIG. 2 is a front view of the jigsaw puzzle when partially completed on top of the word grid.

Along with a specific word grid, different jigsaw puzzles are designed, which when completed display pictoral representations of each one of the words in the grid, respectively. As shown in FIG. 2, the pieces of the jigsaw puzzle are placed over the word grid within the given border. As the jigsaw pieces are connected, the word grid is progressively blocked out. When the jigsaw puzzle is completed, the word and its foreign language counterpart which describe the puzzle illustration is the only part of the word grid which is visible.

Figure 3:
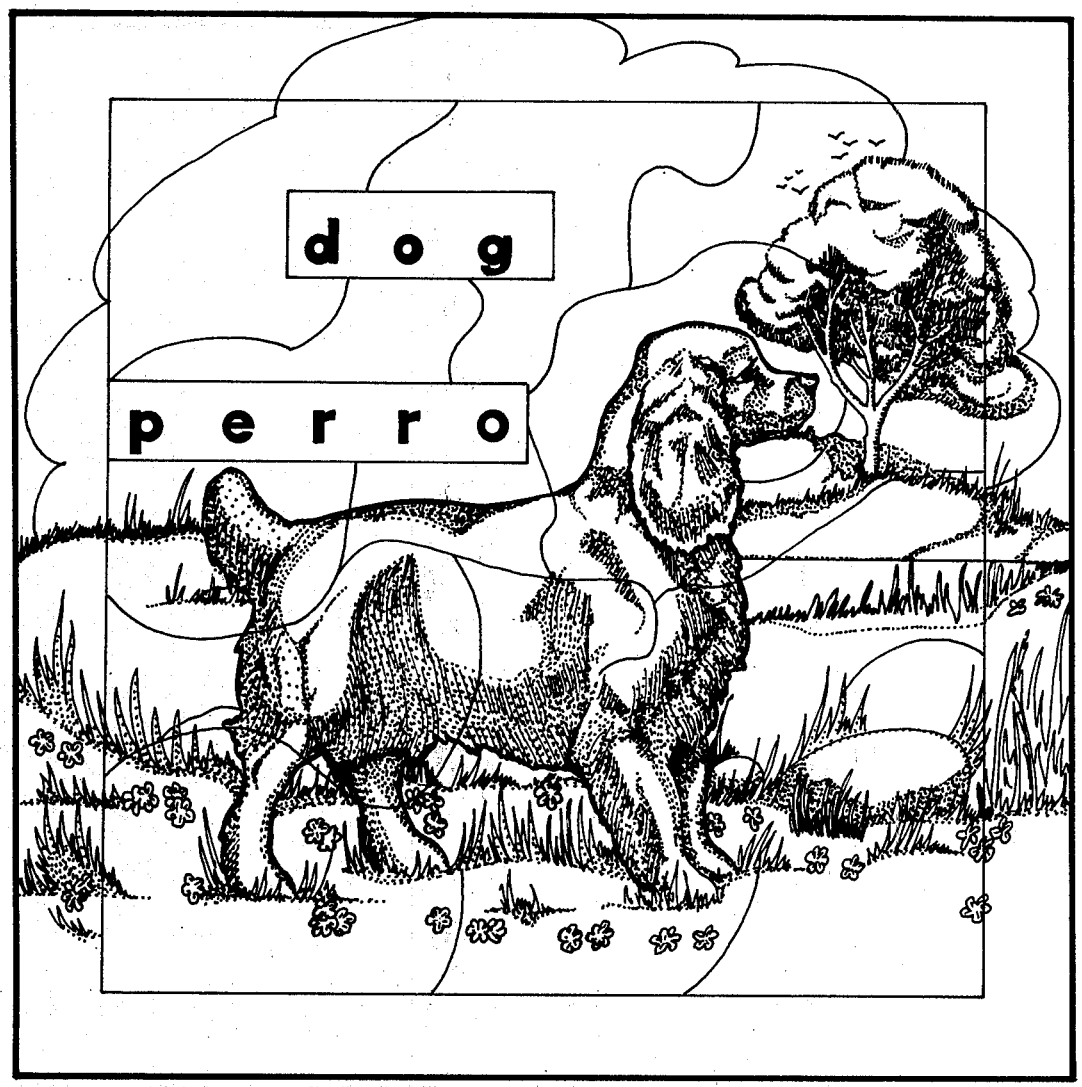
FIG. 3 is a front view of the puzzle when completed.

As can be seen in FIG. 3, the jigsaw pieces fit together in such a manner to form two rectangular windows. The particular locations and sizes of these windows being predetermined so that only the desired words are visible.

Although a preferred embodiment of the invention has been disclosed herein for purposes of illustration, it should be understood that various changes, modifications and substitutions may be incorporated in such embodiment without departing from the true spirit and scope of the invention as set forth in the appended claims.

What is claimed is:

1. Educational apparatus comprising:
board means having a raised border around a recessed area;
sheet means marked with numerous words, said sheet means fitted within said recessed area;
a set of jigsaw puzzle pieces for assembly over said sheet means, said puzzle pieces when completely assembled forming a picture covering all of the words on said sheet means except for the words which represent said picture, said picture being formed solely by said jigsaw puzzle pieces, said representative words appearing through predetermined windows formed by edges of said puzzle pieces.

2. Apparatus according to claim 1 wherein said words are arranged horizontally and vertically in a crossword like pattern.

3. Apparatus according to claim 1 wherein each word on said sheet means has a foreign language counterpart included on said sheet means, the word and its foreign language counterpart which represent said picture each appearing through a predetermined window formed by edges of said puzzle pieces.

4. Apparatus according to either one of claim 1 or 3 wherein said sheet means is interchangeable with other sheet means marked with numerous words, all the words on a specific sheet means relating to a specific theme.

5. Apparatus according to either one of claim 1 or 3 wherein said sheet means is made to accommodate several sets of jigsaw puzzle pieces, each set when completed forming an illustration of a word on said sheet means.

6. Apparatus according to claim 4 wherein each one of said sheet means is made to accommodate several sets of jigsaw puzzle pieces, each set when completed forming an illustration of a word on said sheet means.

* * * * *